United States Patent [19]
Kuhlman et al.

[11] Patent Number: 5,754,795
[45] Date of Patent: May 19, 1998

[54] METHOD FOR COMMUNICATION BETWEEN PROCESSORS OF A MULTI-PROCESSOR SYSTEM

[75] Inventors: J. Charles Kuhlman; Mark A. Borcherding, both of Austin, Tex.

[73] Assignee: Texas Instruments Incorporated, Dallas, Tex.

[21] Appl. No.: 45,276

[22] Filed: Apr. 7, 1993

Related U.S. Application Data

[63] Continuation of Ser. No. 576,258, Aug. 31, 1990, abandoned.

[51] Int. Cl.$^6$ ............................................. G06F 13/00
[52] U.S. Cl. .................... 395/200.66; 395/200.56; 395/200.76; 395/674; 395/821
[58] Field of Search ............... 364/DIG. 1, DIG. 2; 395/650, 200.66, 200.56, 200.76, 674, 821

[56] References Cited

U.S. PATENT DOCUMENTS

| | | | |
|---|---|---|---|
| 4,138,718 | 2/1979 | Toke et al. | 364/200 |
| 4,253,146 | 2/1981 | Bellamy et al. | 364/200 |
| 4,538,226 | 8/1985 | Hori | 364/200 |
| 4,695,977 | 9/1987 | Hansen et al. | 364/900 |
| 4,724,521 | 2/1988 | Carron et al. | 364/300 |
| 4,750,116 | 6/1988 | Pham et al. | 395/650 |
| 4,819,149 | 4/1989 | Sanik et al. | 364/132 |
| 4,855,903 | 8/1989 | Carleton et al. | 364/200 |
| 4,858,101 | 8/1989 | Stewart et al. | 395/275 |
| 4,959,771 | 9/1990 | Ardini, Jr. et al. | 364/200 |
| 5,036,453 | 7/1991 | Renner et al. | 364/200 |
| 5,036,539 | 7/1991 | Wrench, Jr. et al. | 381/43 |
| 5,056,015 | 10/1991 | Baldwin et al. | 364/200 |
| 5,063,494 | 11/1991 | Davidowski et al. | 395/800 |
| 5,089,954 | 2/1992 | Rago | 395/600 |

*Primary Examiner*—Lucien U. Toplu
*Attorney, Agent, or Firm*—Ronald O. Neerings; James C. Kesterson; Richard Donaldson

[57] ABSTRACT

A method for designing and operating a multi-processor computer system, in which data required for performing a task is determined by a first processor and then downloaded to a second processor that will execute the task. The data is associated with regions whose uses are expected by the second processor but whose actual contents are determined by the first processor. The method accommodates mutually exclusive access by both processors to memory of the second processor, while providing all data required for the task in a single read operation.

10 Claims, 2 Drawing Sheets

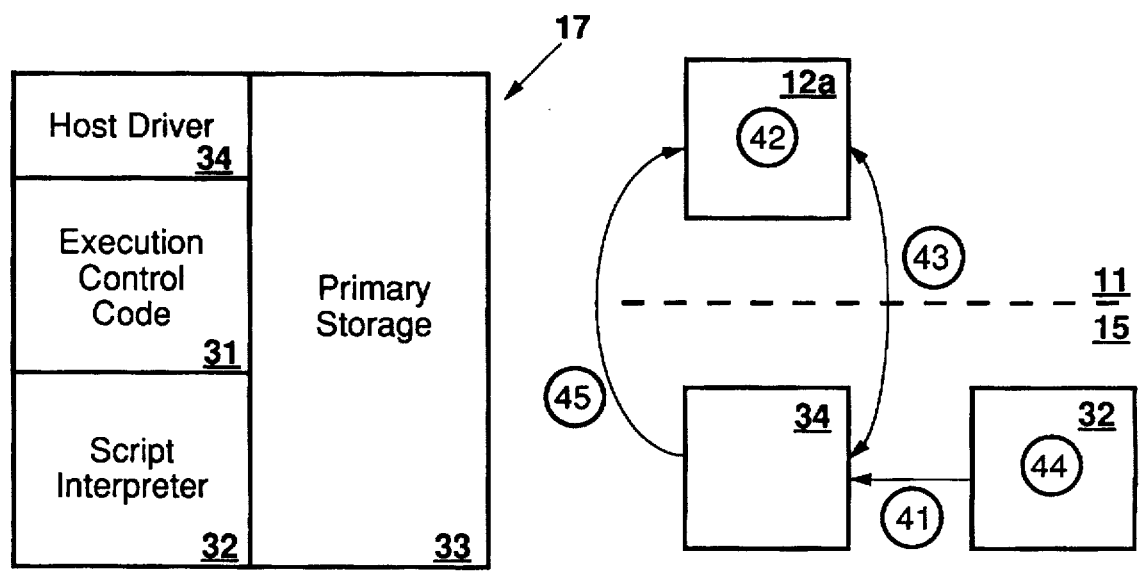
Fig. 3
Fig. 4
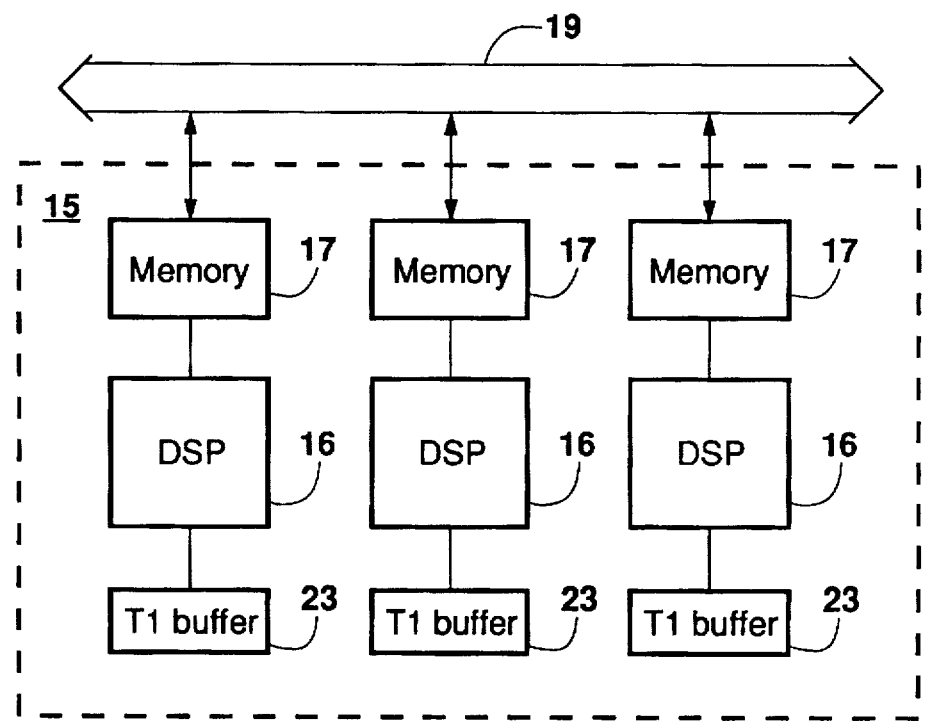
Fig. 5

METHOD FOR COMMUNICATION BETWEEN PROCESSORS OF A MULTI-PROCESSOR SYSTEM

This application is a Continuation of application Ser. No. 07/576,258 filed Aug. 31, 1990 now abandoned.

TECHNICAL FIELD OF THE INVENTION

This invention relates to computer processing, and more particularly to a method of communication between a host processor and a second processor of a multi-processor system.

BACKGROUND OF THE INVENTION

Recent digital signal processing applications use multi-processor computer systems having a host processor in communication with a digital signal processor. The advantage of this multi-processor configuration is that the host processor can be a general processor, suited to tasks such as input and output and freed of digital signal processing tasks, which can be handled more efficiently using a task-specific processor.

A potential disadvantage of such a configuration is communication overhead between the processors. In a typical application, both processors have associated memories, and the host processor asynchronously downloads various data to the signal processor. This data includes scripts, which represent routines to be executed by the processor. Other data to be downloaded includes parameters for the script and data to be operated on.

The available methods for downloading data are related to the memory management scheme of the multi-processor system. One memory management approach is to give the host processor dominant control over the memory of the signal processor and permit it to simply download data at will. However, for maximum processing power, it is desirable to permit the signal processor to access its memory exclusively of the host processor. Ideally, the memory management system has a means for allocating control and permits both processors to read and write to the signal processor's memory without unauthorized interruption.

Yet, despite the advantages of such a memory management system in terms of processing power, such a system inhibits the ability of the host processor to download data into the signal processor's memory. If the amount of data is indeterminate, some method must be used to inform the second processor of when the data begins and ends. One such method is to first download an initial block of data containing an identification of the remaining data to accompany execution of the script. However, a shortcoming of this method is that more than one read must be performed, with a resulting loss of efficiency.

A need exists for a more efficient method for exchanging data in a multi-processor, multiple memory environment.

SUMMARY OF THE INVENTION

One aspect of the invention is a method of downloading data from a host processor that determines tasks to be performed by a second processor, to the second processor. The memories of both processors are associated with regions, which are areas of memory designated according to function and having a common identifier recognized by both processors. When the second processor is ready to perform a task, it prepares to read a selection set of regions, which includes all data that might be needed for executing the task. The host processor determines a region subset, which represents the data that is actually needed for execution of said task, and writes this region subset to memory associated with the second processor. As each task is completed, the second processor signals the completion to the host processor, which indicates to the host processor that the second processor is awaiting the region subset for a new task.

A technical advantage of the invention is that data is transferred from one processor to another in a manner that is both efficient and safe. The I/O overhead of downloading program code and other data from a host processor to a second processor is reduced. Yet, the second processor is permitted sufficient control over its memory so that accesses by the host do not disturb accesses by the second processor.

BRIEF DESCRIPTION OF THE DRAWINGS

FIG. 3 is a functional diagram of the program and data storage of the second processor of FIG. 1.

FIG. 4 is a process diagram of the process of downloading data from the host processor to the second processor.

FIG. 5 is an alternative embodiment of the second processor, which has more than one processing element.

DETAILED DESCRIPTION OF THE INVENTION

Figure 1:
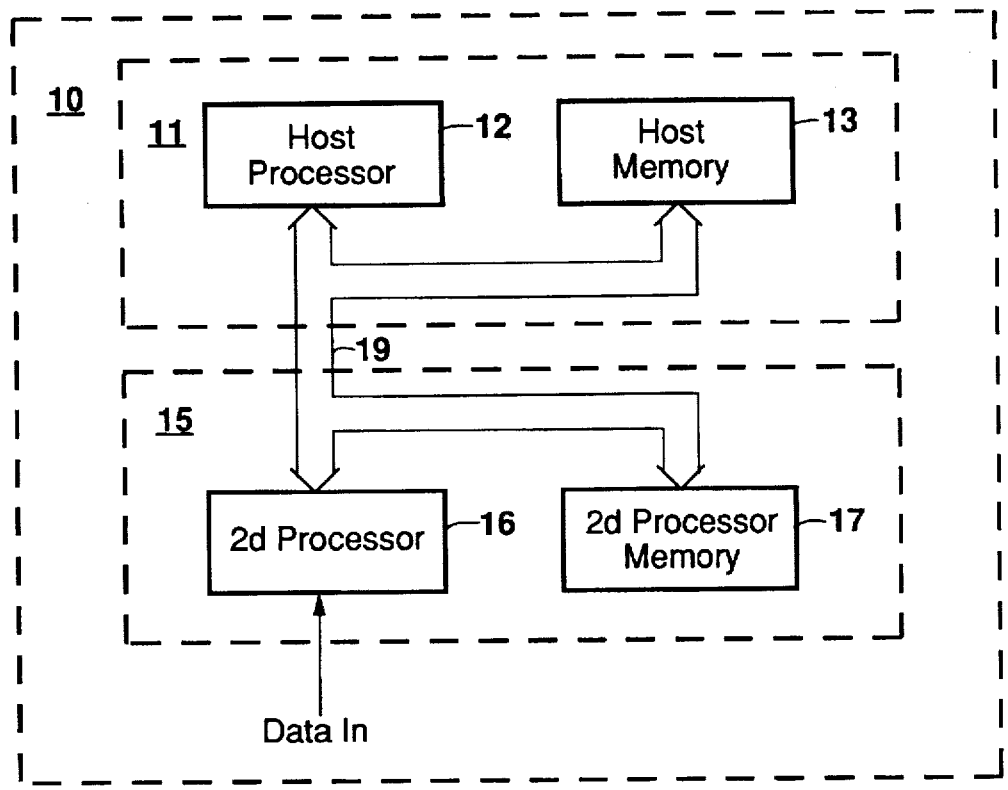
FIG. 1 is a block diagram of a multi-processor system, having a host processor system in communication with a secondary processor.

FIG. 1 is a block diagram of a multiprocessor digital signal processing system 10, having a host processor system 11 in communication with a signal processor system 15. The communication means between processors 11 and 15 is a bus line 19, conforming to any one of a number of recognized standards for binary communications, such as the 32-bit NuBus standard. An advantage of the invention is that it is compatible with the simple, memory-mapped architecture of the NuBus standard.

Host processor system 11 includes a host processor 12 and memory 13. Host processor is typically a general purpose processor, for example the 68030 manufactured by Motorola Corporation. Memory 13 includes a program memory for storing instructions for host processor 12, as well as memory for storing program routines and parameters to be downloaded to signal processor system 15. The downloading process is further explained below.

Signal processor system 15 includes a signal processor 16 and a memory 17. An example of signal processor 16 is the TMS 320C30, manufactured by Texas Instruments, Inc. A suitable size for memory 17 for the application described herein is 250K×4 bytes. Signal processor 16 executes program routines downloaded to it from host processor 12. When execution of one program routine is complete, signal processor 16 notifies host processor 12, so that host processor 12 may download another routine.

Figure 2:
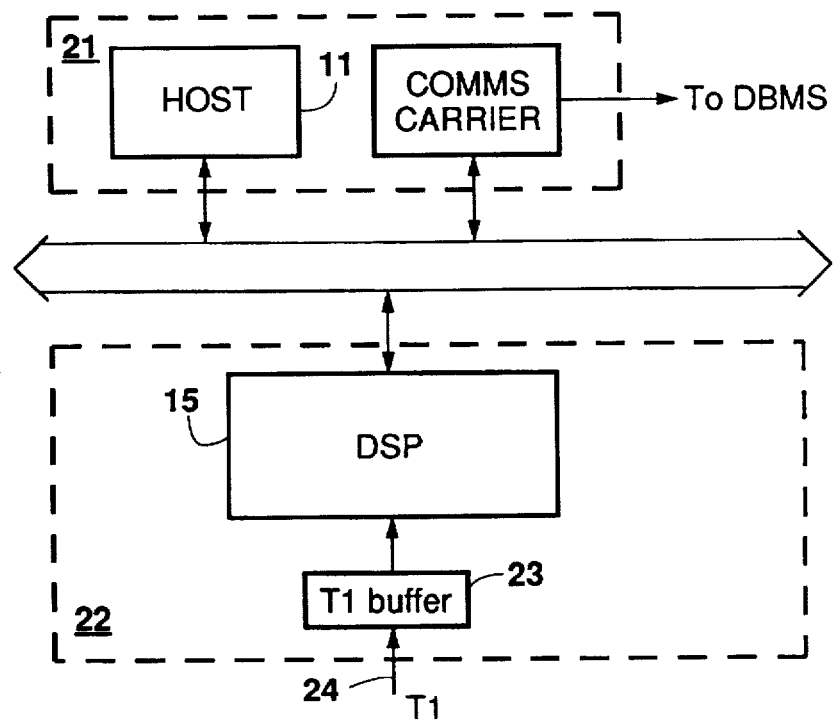
FIG. 2 illustrates an application of the multi-processor system of FIG. 1.

FIG. 2 illustrates a typical application of multiprocessor system 10, used for processing telephone communications. In this application, host processor system 11 is part of a service control system 21, which handles a voice mail service. The service control system 21 also has a communications carrier and appropriate interfaces for communicating with a database management system (not shown), which maintains customer records and other information requiring a large database system. Service control system 21 is also in communication, via bus 19, with a telephony control system 22 that includes digital signal processing system 15. Via a T1 buffer 23, digital signal processing system 15 receives data from a T1 line 24 and performs the actual sending and receiving of voice data according to telecommunications protocols. An example of T1 buffer 23 is the Mitel MT8920 ST-bus parallel access circuit. As explained below in connection with FIG. 3, in practical applications of the invention, signal processing system 15 is a multi-processor, multi-tasking system, having a plurality of signal processors 16 and receiving input from multiple channels of the T1 line.

A more complete description of use of multiprocessor system 10 for a voice mail application is set out in copending U.S. patent application Ser. No. , entitled "Digital Signal Processing Control Method and Apparatus", also assigned to the assignee of the present invention. The method described herein is one method of transferring data within the multi-processor environment of that invention. However, the method of the present invention is not limited to operation with that specific configuration, and as indicated by FIG. 1, could be used with any multiprocessor environment in which at least two processors share access to the memory of one processor.

The processing tasks of signal processing system 15, i.e., the functions to be performed by signal processor 16, are represented by portions of an application program loaded to host processor system 11. These portions of code are referred to herein as "scripts". Host processor 12 dynamically determines the specific sequence of tasks to be performed, and therefore determines the "script". The script is downloaded to signal processor 16 in a pseudo code form, and is interpreted by a script interpreter 32, shown in FIG. 3. The result is a set of byte codes that specify tasks that host processor 12 requires signal processor 16 to perform.

In the voice mail application, tasks are initiated by incoming calls. One example of a task is answering a telephone. Other tasks include listening to a message, recording a message, etc. In an application such as voice message processing, once the task of answering a telephone is performed, the tasks that follow vary according to caller input. For example, the caller may request to listen to messages, record messages, reach an operator, etc. Thus, in the voice message application, the script is the code that signal processor 16 will execute once a telephone is answered.

FIG. 3 is a functional block diagram of the program and data storage of signal processor 16, as stored in memory 17. The programming has three main parts: an execution control section 31, a script interpreter section 32, and a host driver section 34. The execution control section 31 stores code executed by signal processor 16 and not changed by host processor 12. This code supports calls for specific primitive functions from downloaded routines. For example, a downloaded routine might call a function "gen-tone (5)", which indicates that a DTMF signal corresponding to a keypad digit 5 is desired. Host driver 34 handles I/O to and from host processor 12, in a manner similar to I/O handling by a standard device driver to and from a peripheral such as a disk drive. The script interpreter section 32 interprets scripts as explained above. As indicated in FIG. 3, memory 17 also has a primary storage area 33 for storing program code and other data downloaded from host processor 12.

Host processor 12 and signal processor 16 are each capable of exclusive control over access to their respective memories 13 and 17. Thus, each processor 12 and 16 performs its own I/O operations. As explained below, a feature of the invention is that it permits this mutually exclusive control, yet permits signal processor 16 to receive data from host processor 12 when the content and amount of the data to be transmitted is determined solely by host processor 12.

A basic concept of the invention is the use of memory regions. A region is a logical address, or name, of an area of memory that more than one processor agree to use for a particular purpose. For purposes of this description, this agreement among processors is achieved by providing each processor 12 and 16 with region identifiers so that both processors can refer to memory with this identifier rather than with addresses.

Thus, memories 13 and 17 have matched regions, meaning that certain memory areas are associated in both memories with the same use. A task or set of tasks is associated with four or five regions, which are exclusive to that task or task set. However, the regions use the same names. For example, the script region for all tasks might be named Region A, although the code is stored in different memory locations of host processor 12. One region is dedicated to scripts, another to script parameters, and other regions store various kinds of data to be processed. In the example of this description, the data to be processed is voice data.

When host processor 12 and signal processor 16 initialize themselves, they set up memory spaces and allocate regions. Each processor 12 and 16 maintains a copy of each region. When one processor builds or modifies a region, it may perform a write operation to transfer the contents of the region to the other processor.

For interprocessor communications, in particular downloading from host processor 12 to signal processor 16, host processor 12 may specify by region, the data it desires to write to signal processor 16. Signal processor 16 performs a matching read operation to receive the region's data. These matching write and read operations are an important feature of the invention, in that they are compatible with permitting signal processor 16 to control access to a region, exclusively of host processor 12. Requiring signal processor 16 to request a region before it can be delivered makes it impossible for host processor 12 to write to that region before signal processor 16 is finished accessing it.

The matching write and read operations are complicated by the fact that some regions must be transferred from host processor 12 to signal processor 16 before signal processor 16 can begin execution of a script for a particular task. Furthermore, the particular set of regions to execute the script is determined by host processor 12 and not by signal processor 16. Thus, signal processor 16 does not know what data to expect.

One method for obtaining the necessary data would be to obtain the regions needed by separately reading each of them. The script region could be always defined and its first instructions could be the read instructions for the other regions that are needed. However, this method entails processing overhead, more specifically, setting up an I/O operation once per region.

The method of the invention reduces processing overhead by means of a "compound read" operation, using host driver 34. This operation requires an I/O operation only once per script, and permits signal processor 16 to receive all the regions it needs at once.

FIG. 4 is a data flow diagram that illustrates the downloading process with a compound read. The compound read is initiated when signal processor 16 is ready for a new script. In step 41, script interpreter 32 determines it is ready for a task and presents host driver 34 with a "selection" set of regions. This selection set is characterized by the inclusion of all possible regions that might be required for the task, and is the set of regions that second processor 16 expects to read. In step 42, host processor 12, using programming 12a for handling the communications between host processor 12 and second processor 16, determines a subset of regions that are actually required. This "region subset" includes regions for the script for the task, a set of parameters, and may also include one or more regions for other data. The determination of the proper script may be based on parameters uploaded from signal processor 16, which were generated during processing of a prior script. In step 43, host processor 12 writes this subset to signal processor 16 via host driver 34, which host driver 34 reads because the region subset is part of the selection set. Host processor 12 also writes a list of the regions in the region subset so that host driver 34 can determine when to return processing control to script interpreter 32. In step 44, processing control returns to script interpreter 32, which executes the script. In step 45, which occurs when the task is completed, the second processor 16 signals completion to host processor 12, so that host processor 12 will deliver another region subset.

As an example of the operation of the invention to perform a task of recording a voice, signal processor 16 indicates to host processor 12 that it is ready to perform a new task. It calls for a compound read of the selection set of regions. The host processor 12 then delivers the region subset to signal processor 16, specifically, regions representing the script for that task, a set of parameters, and perhaps other data. The host driver 34 receives these regions, and passes control to script interpreter 32, which begins execution of the task. Execution of the task includes processing a voice recording algorithm, which resides in memory 17.

In an alternative form of the invention, the selection set of regions is known to host processor 12, by means other than being explicitly identified by script interpreter 32. Host processor 12 determines the region subset prior to the read performed by host driver 33. For example, second processor 16 may be part of a multiprocessor system, or the system described below in connection with FIG. 5, and be dedicated to a certain task.

FIG. 5 illustrates an enhancement of the invention in which signal processor system 15 is actually a group of signal processors 16 in communication with each other. This configuration permits signal processor system 15 to perform more than one task simultaneously. For example, signal processor system 15 might be comprised of three signal processors 16, as in FIG. 5. Each signal processor 16 has its own memory 17 and T1 buffer 23. The memories are cross-coupled to permit communications among signal processors 16.

Each signal processor 16 has a call handler, so that more than one incoming call may be simultaneously processed. The processing may be different for each call depending on the scripts delivered from host processor 12.

As an example of the operation of the multi-tasking configuration of FIG. 5, a possible task is answering a telephone. Script interpreter 32 performs a compound read to receive the selection set, and host processor 12 delivers the region subset, including the script for this task, to script interpreter 32 via host driver 34. Each processor unit 16 capable of executing the task interprets the script and prepares to perform it. When a telephone rings, the first available processor 16 will answer the call and its script interpreter 32 will process the call. The next telephone ring will be answered by a second processor 16 and processed by its script interpreter 32, etc.

Other Embodiments

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

What is claimed is:

1. A multiprocessor system, comprising:

a host processor and a host processor memory;

a second processor and a second processor memory coupled to said host processor and said host processor memory; and means for combining several I/O transfers between said host and said second processors into one I/O operation per script.

2. The system of claim 1, wherein said host processor and said second processor have exclusive control over access to their respective memories yet permit said second processor to receive data from said host processor when the content and amount of data to be transmitted is determined solely by said host processor.

3. The system of claim 1, wherein said memories have matched regions or memory areas associated with the same use.

4. The system of claim 1, wherein said host processor determines program code representing tasks or program routines to be executed by said second processor.

5. The system of claim 1, wherein said host memory comprises a program memory for storing instructions for said host processor and memory for storing program routines and parameters to be downloaded to said second processor.

6. The system of claim 1 wherein said host and second processors perform matching write and read operations.

7. A method for communications in a multiprocessor environment in which at least two processors share access to the memory of one processor, comprising:

matching regions or areas of memory in the memories of a first processor and a second processor with the same use;

detecting that said second processor is ready to perform a task;

associating data required for performing said task with regions or areas of memory in the memory of said first processor whose uses are expected by said second processor but whose actual contents are determined by said first processor; and transferring all the data required for performing said task from the first processor to said second processor in a single read operation.

8. The method of claim 7 further including the step of performing said task, said second processor signaling the completion of said task to said host processor.

9. The method of claim 7, wherein the second processor is permitted sufficient control over its memory so that access by the first processor does not disturb access by the second processor.

10. The method of claim 7, wherein said first and second processors perform matching write and read operations to transfer data.

* * * * *